United States Patent [19]

Malsky

[11] Patent Number: 5,179,308
[45] Date of Patent: Jan. 12, 1993

[54] HIGH-SPEED, LOW-LOSS ANTIFRICTION BEARING ASSEMBLY

[75] Inventor: Herbert Malsky, Belmont, Mass.

[73] Assignee: Charles Stark Draper Laboratory, Inc., Cambridge, Mass.

[21] Appl. No.: 820,341

[22] Filed: Jan. 14, 1992

[51] Int. Cl.⁵ .............................................. H02K 7/09
[52] U.S. Cl. ................................................ 310/90.5
[58] Field of Search ...................... 310/90.5, 178, 254, 310/258, 269

[56] References Cited

U.S. PATENT DOCUMENTS

| | | | |
|---|---|---|---|
| 3,863,508 | 2/1975 | Scarborough | 73/516 R |
| 3,937,533 | 2/1976 | Veillete | 310/90.5 |
| 4,059,510 | 11/1977 | Reading | 209/223 A |
| 4,077,678 | 3/1978 | Studer et al. | |
| 4,121,143 | 10/1978 | Habermann et al. | 310/90.5 |
| 4,186,609 | 2/1980 | Baerman | 73/497 |
| 4,262,877 | 4/1981 | Lang | 251/141 |
| 4,387,935 | 6/1983 | Studer | 310/90.5 |
| 4,405,286 | 9/1983 | Studer | |
| 4,410,819 | 10/1983 | Kobayashi et al. | 310/105 |
| 4,423,344 | 12/1983 | Jones | 310/105 |
| 4,483,570 | 11/1984 | Inoue | |
| 4,663,536 | 5/1987 | Roesel, Jr. et al. | 290/7 |
| 4,720,649 | 1/1988 | Habermann et al. | 310/90.5 |
| 4,812,690 | 3/1989 | Eilertsen | 310/27 |
| 4,836,631 | 6/1989 | Shimazu et al. | 350/6.8 |
| 4,891,567 | 1/1990 | Fujitani et al. | 318/254 |
| 4,920,291 | 4/1990 | McSparran | 310/90.5 |
| 4,924,128 | 5/1990 | Vaillant de Guelis et al. | 310/156 |
| 4,983,869 | 1/1991 | Vaidya et al. | 310/90.5 |
| 4,983,870 | 1/1991 | McSparran | 310/90.5 |
| 4,990,806 | 2/1991 | Kikuchi et al. | 310/49 A |
| 5,111,102 | 5/1992 | Meeks | 310/90.5 |

FOREIGN PATENT DOCUMENTS

| | | | |
|---|---|---|---|
| 184319 | 10/1983 | Japan | 310/90.5 |
| 0160626 | 7/1986 | Japan | 310/90.5 |
| 63-99742 | 5/1988 | Japan | 310/90.5 |
| 0269722 | 10/1989 | Japan | 310/90.5 |

*Primary Examiner*—Emanuel T. Voeltz
*Assistant Examiner*—C. LaBalle
*Attorney, Agent, or Firm*—Weingarten, Schurgin, Gagnebin & Hayes

[57] ABSTRACT

Antifriction bearings include circumferential as well as axial flux paths that the flux of four identical-polarity magnetic poles follows about an annular stator having annular end-pieces that enables a square law reduction in rotor eddy current effects over the heretofore known magnetic bearings. In one embodiment, control coils alone provide magnetic suspension along orthogonal X, Y axes, and in another embodiment, combination control and bias coils cooperate to provide magnetic suspension along the orthogonal X, Y axes. The stator and rotor are preferably constituted, in part, of a lamination of high magnetic permeability material.

15 Claims, 4 Drawing Sheets

HIGH-SPEED, LOW-LOSS ANTIFRICTION BEARING ASSEMBLY

FIELD OF THE INVENTION

The instant invention is directed to the field of antifriction bearings, and more particularly, to a novel high-speed, low-loss antifriction bearing assembly.

BACKGROUND OF THE INVENTION

Magnetic suspensions are commonly employed where it is necessary or desirable to provide antifriction bearings for a rotating member such as a shaft. In a typical configuration, eight (8) poles, a first set of opposing pairs of poles to control the position of the rotating member about a first axis and a second set of opposing pairs of poles to control the position of the rotating member about a second axis orthogonal to the first axis, are provided on a stator. Each pole pair of the opposing pole pairs of the first and second sets of pole pairs is typically wrapped with a pair of control coils in electrical series relation. Excitation of the series coil pair of any pair of poles of either set of opposing pole pairs induces an additive magnetomotive force, that attracts the shaft, and a flux that traverses a magnetic circuit that is constituted by those poles, the included part of the rotor backiron and rotor and the poles/rotor gaps. To reverse the direction of force that acts on the rotor, the opposing serially connected coils of a set of pole pairs are excited. The magnitude of the force is proportional to the flux density squared, and directly proportional to the pole pair area.

To improve the speed of response of the control coils, and to linearize force as a function of flux density, it is known to additionally wrap a bias coil on each pole, in series with all of the other bias coils, and to electrically connect in series the control coils of the opposing pairs of poles of each set of opposing pole pairs. The bias coils are typically excited to provide a constant flux density across the gaps, usually at one half the saturation flux density of the pole magnetic material. The flux produced by the bias coils does not create a net force. The control coils, connected in series for each axis, are activated to provide a control flux that is added to the bias flux on one end and subtracted on the other end to produce a net force. Reversing the current reverses the direction of force.

In the typical prior art magnetic bearing embodiment, the eight (8) pole pieces wrapped with control coils, or control/bias coils, to provide four (4) North and four (4) South poles were able to controllably suspend a rotating shaft about mutually orthogonal axes, but the utility thereof in many applications was limited in respect of speed, size and power. The faster the rotating member is to turn, the more quickly the rotor will be cut by the alternating North and South poles of the sets of opposing pole pairs of the heretofore known magnetic bearings, and the greater the eddy current and hysteresis effects that will be induced in the rotor thereof. These eddy current and hysteresis effects produce heat and torque on the rotating member, thereby placing an upper bound on the rotor's rotational speed beyond which the heretofore known magnetic bearings became ineffective.

For a given force, the series coils for a pole pair must provide a magnetomotive force sufficient to overcome the high reluctance of two air gaps. A high ampere-turn condition is required which results in high power input. Or, increased volume for a lower power coil is traded off for pole volume which results in less force capability.

Also, the stator backiron radial dimension is equal to the thickness of a pole piece in order to reach magnetic saturation simultaneously in the pole piece and backiron. This limitation on backiron thickness further limits the volume available to coils.

SUMMARY OF THE INVENTION

It is accordingly the principal object of the present invention to provide a high-speed, low-loss antifriction bearing assembly that, for the same force as the heretofore known magnetic bearings, is able to be constructed in a more compact configuration, and conversely, for the same total volume as the heretofore known magnetic bearings, is able either to deliver more force or to use less power. In accord therewith, a stator is disclosed having four (4) radially depending pole pieces, one pair of opposing pole pieces controlling shaft position along one axis and the other pair of opposing pole pieces controlling shaft position along an axis orthogonal thereto; the stator further having first and second low-reluctance annular end-pieces one to either side of the four pole pieces.

In further accord therewith, coils are wrapped about each of the four pole pieces, and in one embodiment, opposing pole pieces are wrapped with control coils in series and each pole piece is wrapped with a bias coil in series with all the other bias coils, and in another embodiment, each of the four pole pieces is individually wrapped with control coils only. A rotor is disposed concentrically within the stator. Each of the pole pieces, as well as the rotor, is preferably constituted, at least in part, as a lamination of high magnetic permeability material.

One aspect of the antifriction bearing of the present invention is a square-law reduction in eddy current losses over that of the heretofore known magnetic bearing assemblies, which enables to provide higher rotational speed magnetic suspension than heretofore possible. Eddy current effects are proportional, among other things, to the square of the total change in magnitude of the flux lines cut by the rotor as it rotates. In the preferred embodiment, the pole pieces, that are spaced apart every ninety (90) degrees of arc, are so wrapped as to provide identical polarity magnetic poles. The laminated rotor is cut by flux lines that change in magnitude from maximum flux to zero (0) flux and back again to maximum flux every quarter turn, half as much as that of the rotating member of the heretofore known magnetic bearings.

One feature of the high-speed low-loss antifriction bearing of the invention is that it may be made to be more compact than the heretofore known magnetic bearings for the same total pole area and corresponding force. For a given diameter magnetic bearing, more volume is available for coils, enabling higher force for a given diameter, or a smaller overall bearing for the same force. The flux produced by each of the control coils individually wrapped about another one of the pole pieces in the embodiment where control coils alone provide suspension travels circumferentially around the stator and returns through the other three pole pieces as well as travels axially outwardly towards both stator ends and returns through the low-reluctance annular end-pieces, and the flux produced by the control coil pairs and series bias coils in the embodiment where control/bias coils provide suspension flows axially outwardly towards both stator ends and returns through the low-reluctance annular end-pieces, relaxing thereby the constraint of the heretofore known bearings that the radial dimension of the stator backiron must have been equal to the thickness of a pole piece and therewith freeing up more internal volume than heretofore available.

Another aspect of the high-speed low-loss antifriction bearing assembly of the present invention is a reduction in reluctance by a factor up to one half that of the heretofore known magnetic bearings. The number of poles are lessened by a factor of two. The reluctance of the low-reluctance annular end-pieces is negligible compared to that of the pole gaps. Since the magnetic pole gap gives the principal measure of reluctance, and since the poles have been reduced by a factor of two, antifriction bearing assemblies constructed in accord with the instant invention exhibit, for the same force, a reluctance reduced by up to a factor of two over the heretofore known magnetic bearings. For the same pole area, and force which corresponds thereto, since the reluctance is lessened by a factor of up to one half, the number of ampere turns required to produce the same force is lessened by the same factor. Since power consumption is related to the square of the ampere turns, power consumption is reduced by up to a factor of four over the heretofore known magnetic bearings.

BRIEF DESCRIPTION OF THE DRAWINGS

These and other objects, features and aspects of the present invention will become apparent as the invention becomes better understood by referring to the following solely-exemplary and non-limiting detailed description of the preferred embodiments thereof, and to the drawings, wherein.

FIG. illustrates in the FIGS. 1A, 1B thereof pictorial cross-sectional views of a prior art magnetic bearing respectively for unbiased and for biased operation.

DETAILED DESCRIPTION OF THE PREFERRED EMBODIMENTS

Figure 1A:
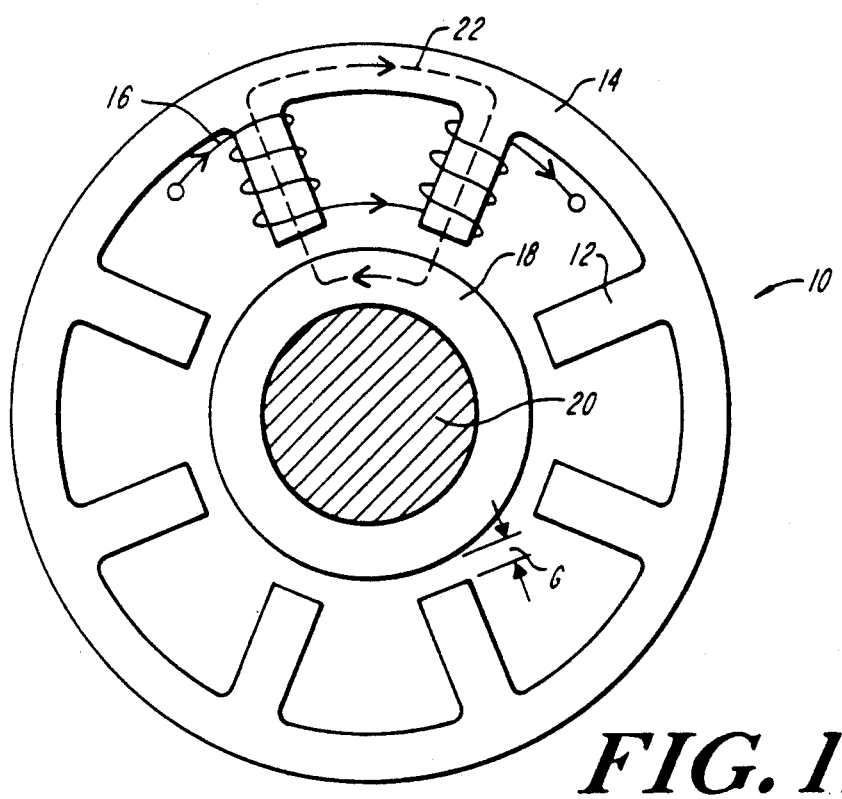

Referring now to FIG 1A, generally designated at 10 is a cross-sectional view illustrating a prior art magnetic bearing for unbiased operation. Eight (8) pole pieces 12 radially depend symmetrically off a stator 14. Control coils 16 are wrapped about adjacent pole pieces in series, one such serial coil pair wrapped about one such pair of adjacent pole pieces being specifically illustrated. The flux produced by the series coils of adjacent pole pieces produces an additive force on rotor 18 concentrically positioned within stator 14. The rotor 18 is mounted for rotation with shaft 20. The stator 14 and the rotor 18 are fabricated of a high magnetic permeability material, such as carbon steel, and the flux produced by the series control coils of adjacent pole pieces traverse a magnetic path schematically illustrated in dashed outline 22 through the stator 14 and one of the pole pieces and across the magnetic gap thereof marked "G" to the rotor, thence through the rotor and across the other magnetic gap to the other pole piece, and through that pole piece back through the stator in a magnetic flux loop. A high-bandwidth controller, not shown, is coupled to each of the serially connected coils of adjacent pole pieces to apply current differentially to the series coils wrapped about adjacent pole pieces of opposing pairs of serially wrapped coils in order to induce that differential flux to the several coils that keeps the rotor 18 and therewith the shaft 20 co-axially positioned about mutually orthogonal X, Y axes in a manner well-known to those skilled in the art.

Figure 1B:
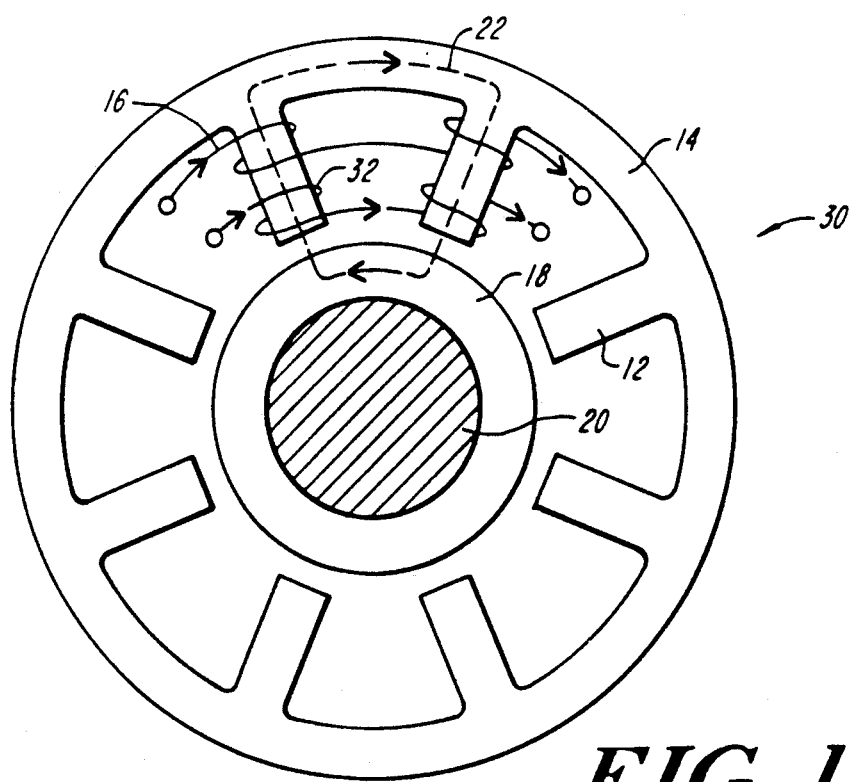

Referring now to FIG. 1B, generally designed at 30 is another prior art magnetic bearing for biased operation. The bearing 30 of FIG. 1B differs from the bearing 10 of the FIG. 1A in the respect that it is wrapped with bias coils 32 in addition to the control coils 16, and in the respect that control coils of adjacent pole pieces are in electrical series relation with the coils of adjacent pole pieces in opposing relation thereto. The bias coils are all connected in series about the several pole pieces. A controller, not shown, is coupled to the bias coils and to the series-connected control coils of opposing pairs of adjacent pole pieces. The bias coils, upon excitation, provide a constant flux density across the magnetic gaps, usually at one half the saturation flux density of the pole piece magnetic material. The flux produced by the series bias coils does not create a net force. For each of the mutually orthogonal axes, the control coils connected in series, upon excitation, produce a control flux that is added to the bias flux on the one end, and subtracted on the other end, to produce a net force about each of the mutually orthogonal X, Y axes. Reversing the current reverses the direction of force. As will be appreciated by those skilled in the art, biased operation has the advantages of linearizing force as a function of flux density as well as providing improved speed of response.

Figure 2A:
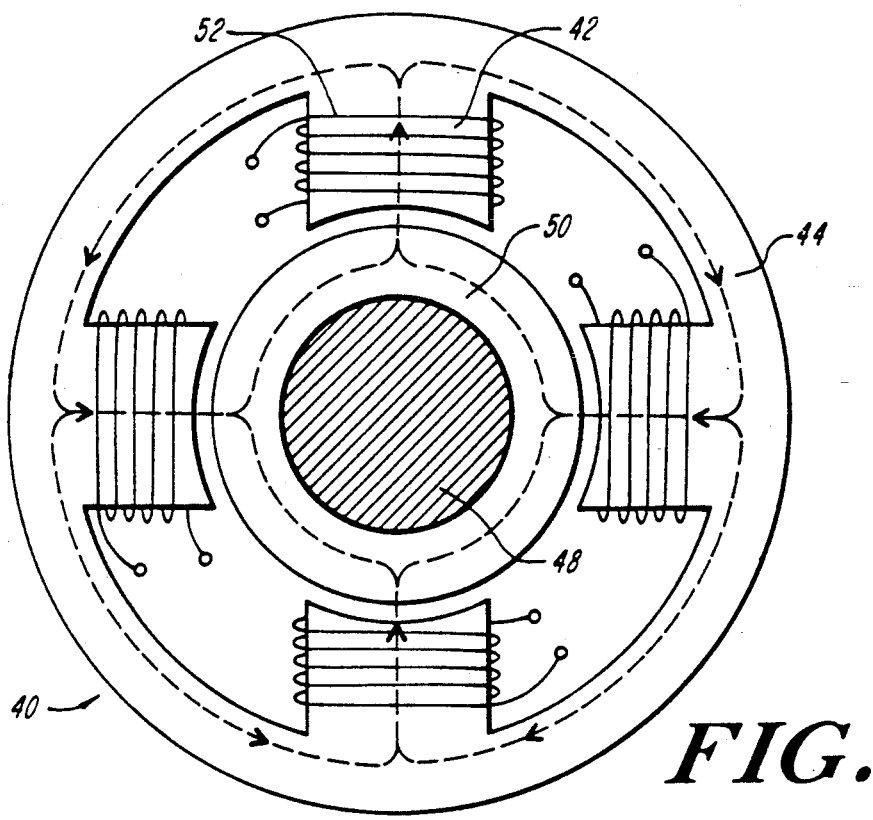
FIG. 2 illustrates in the FIGS. 2A, 2B thereof schematic cross-sectional and end-sectional views of one embodiment of the high-speed, low-loss antifriction bearing assembly in accord with the present invention.
Figure 2B:
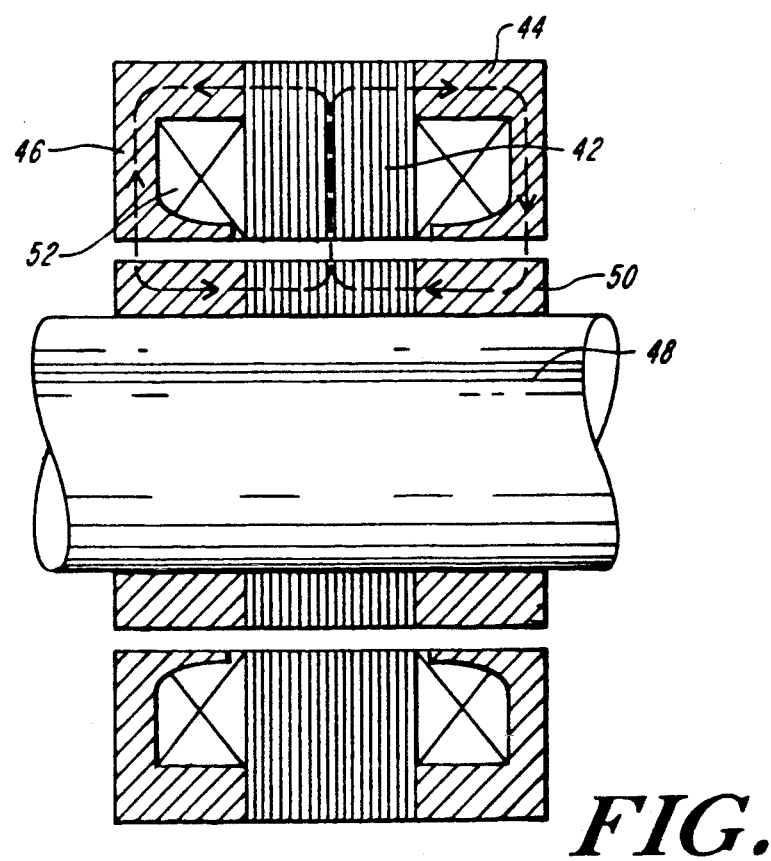

Referring now to FIG. 2A, generally designated at 40 is a schematic cross-sectional view illustrating the novel high-speed, low-loss antifriction bearing assembly in accord with the present invention. The bearing 40 has four (4) pole pieces 42 depending off a stator 44 every ninety (90) degrees. Annular end-pieces 46, one to each side of the stator 44, provide both a low-reluctance flux path, to be described as well as an end abutment which contains the pole piece windings, as best seen in FIG. 2B. The end-pieces 46 may be bolted to the stator 44, or integrally formed therewith, without departing from the inventive concept. A shaft 48 having a laminated rotor 50 to be described mounted for rotation therewith is concentrically provided within the stator 44.

Control coils 52 are individually wrapped about each of the four (4) pole pieces 42 in a manner preferably to provide like-polarity poles, which coils are connected to a high-bandwidth controller, not shown, that applies differential excitation to the individual control coils of opposing pole pairs to establish and maintain suspension of the rotor 50 and therewith the shaft 48 about mutually orthogonal X, Y axes co-axially within the stator 44 in a manner well-known to those skilled in the art.

The flux path followed by the flux produced by individual control coils 52 includes a circumferential component, by which the flux of each of the preferably same polarity magnetic poles flows through all the other three poles circumferentially about stator 44 as best seen in FIG. 2A, and an axial component by which the flux of each magnetic pole flows axially away from each pole through stator 44, through each of the low-reluctance annular end-pieces 46 thereof, thence through the respective low-reluctance magnetic gaps thereof back through rotor 50 to the corresponding pole piece 42, as best seen in FIG. 2B.

As is well known, reluctance is proportional to gap surface area and gap length. Preferably, the free end of each of the annular end-pieces 46 is enlarged, as best seen in FIG. 2B, to provide, for a given gap length, an intended low-reluctance between the annular end-pieces 46 and the rotor 50. In the preferred embodiment, the ratio of the areas of the poles 42 to that of the annular end-pieces 46 is about one (1) to ten (10).

Figure 3A:
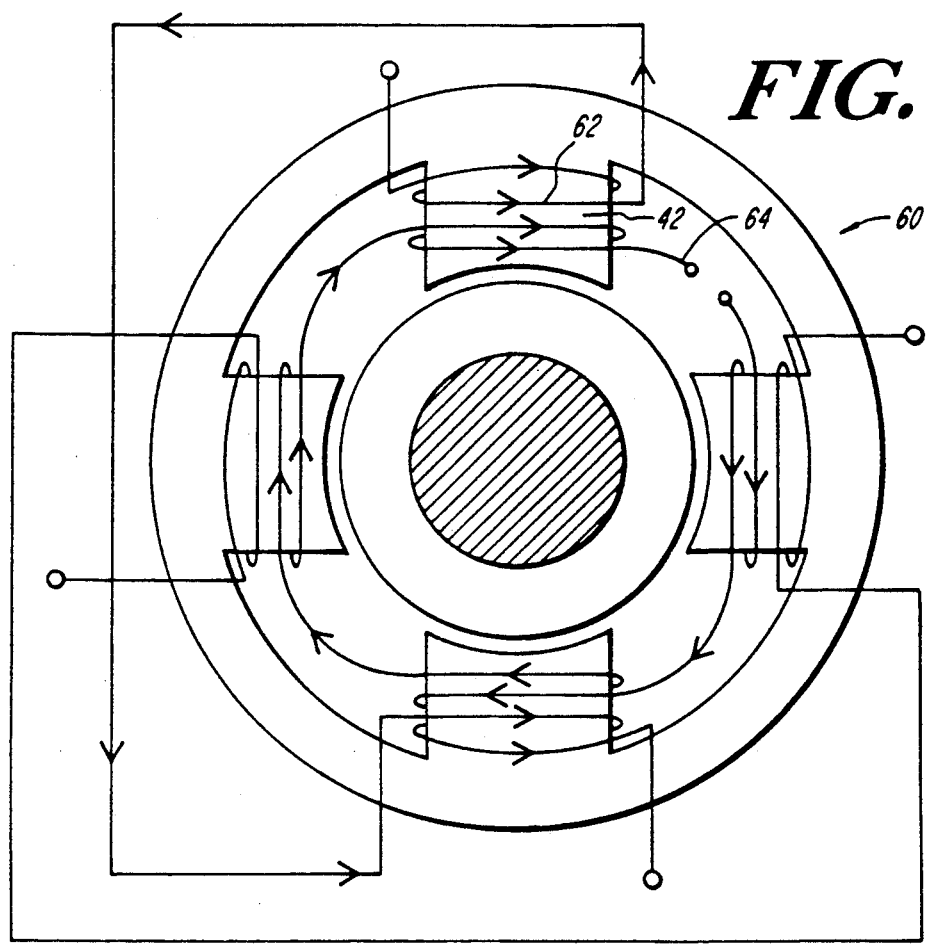
FIG. 3 illustrates in the FIGS. 3A, 3B thereof schematic cross-sectional and end-sectional views of an alternative embodiment of the high-speed, low-loss antifriction bearing assembly in accord with the present invention.

Referring now to FIG. 3, generally designated at 60 in FIG. 3A is a cross-sectional view of another embodiment of the high-speed low-loss antifriction bearing assembly in accord with the present invention. The bearing 60 differs from the bearing 40 of FIG. 2 in the respect that the control coils 62 thereof are wrapped about opposing pole pieces 42 in electrical series relation, both sets of control coils being specifically illustrated, and in the respect that a bias coil 64 is wrapped in series about each of the pole pieces 62.

Figure 3B:
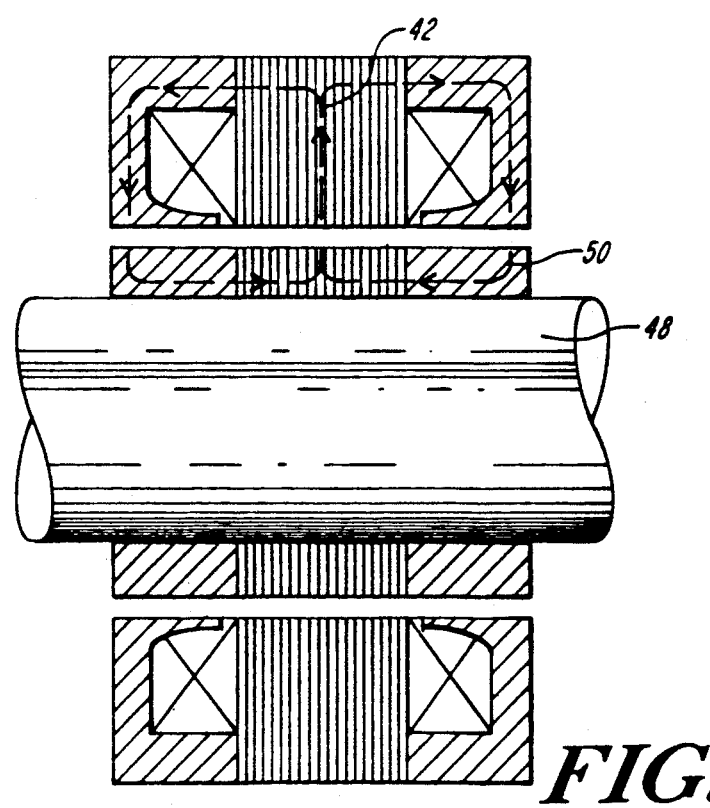

A high-bandwidth controller, not shown, is coupled to the two (2) pairs of series-connected control coils of opposing pole pieces and to the series-connected bias coils thereof. An excitation bias current induces a flux field in the same direction at each pole. With the shaft centered, the flux density is equal at each pole air gap and no net force is exerted on the shaft. The bias flux density's magnitude is normally set at one half the saturation flux density of the rotor material for maximum range linear operation. The circuit of the bias flux is through the poles, across the pole air gaps, dividing to flow axially to the annular end-pieces, and returning to the poles, as best seen in FIG. 3B. There is no flux flow between poles. The two (2) sets of serially-connected control coils wrapped about the two (2) pairs of opposing pole pieces are responsive to excitation control currents to induce additive magnetomotive forces in one pole and subtractive magnetomotive forces in the opposite pole of each of the opposing pairs of magnetic poles. The differential in the resulting flux densities of the opposing magnetic poles of each of the pairs of poles causes a net force on the shaft that respectively acts along mutually orthogonal X, Y directions to center the shaft while suspending it magnetically. Again, reversing direction of the control currents reverses the corresponding forces.

While bias and control coils in one embodiment and control coils in another embodiment are presently preferred, the invention may be practiced with other excitation techniques without departing from the inventive concept.

Figure 4:
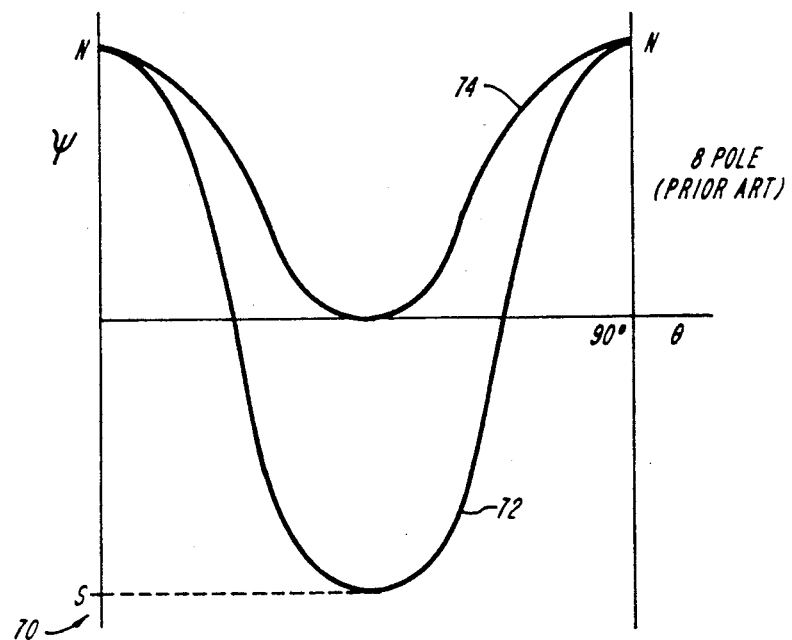
FIG. 4 is a graph useful in explaining the principle of operation of the high-speed, low-loss antifriction bearing assembly in accord with the present invention.

Referring now to FIG. 4, generally designated at 70 is a graph useful in explaining the principle by which antifriction bearings constructed in accord with the present invention are able to operate at higher rotational speeds with lower losses than that of the heretofore known magnetic bearings. By way of example, for a typical prior art bearing, eddy current and hysteresis effects in the rotor, which induce heat and torque on the shaft, have limited rotational speeds to about thirty-six hundred (3600) revolutions per minute, while antifriction bearings constructed in accord with the present invention have been found to be capable of operating at at least twenty four thousand (24,000) revolutions per minute.

The graph 70 plots flux change as ordinate with rotational position as abscissa, where the change in flux with rotor angular position of the prior art eight (8) pole magnetic bearing is shown by curve 72 and where the change in flux with rotor angular position of the four (4) pole antifriction bearing assembly in accord with the present invention is shown by curve 74. For every ninety degrees (90) of rotation of the rotor, the rotating member of the heretofore known eight (8) pole magnetic bearings cuts flux lines that changed in amplitude from a maximum amplitude designated "N" through zero (0) to a maximum negative amplitude designated "S", and back again through zero (0) to the maximum amplitude. For the same (90) ninety degree rotation of the rotor of the antifriction bearings constructed in accord with the present invention, the rotor is cut by flux lines that change in amplitude from the maximum flux "N" through zero (0) and back up again to the maximum flux "N".

As can be seen from the curves 72, 74, the flux lines cut by the rotor of antifriction bearings constructed in accord with the present invention change in magnitude by a factor that is one half as much as that for the rotors constructed in accord with the heretofore known magnetic bearings. Since the power loss attributable to eddy current and hysteresis effects in the rotor is proportional to the square of the change in the peak-to-peak magnitude of the flux lines cut by the rotor, the present invention enables to provide a square-law reduction in core losses (hysteresis and eddy currents) over that of the heretofore known magnetic bearings. At comparatively low rates of revolution, these losses may be negligible, but the faster the shaft is rotated, the losses grow by a square law factor, which has limited the attainable angular speed of magnetic bearings heretofore.

To achieve minimization of core losses, it is preferred that the coils be wrapped to provide like-polarity poles throughout, so that, as the shaft rotates, the rotor is cut by flux lines that change in magnitude only between zero (0) and the maximum polarity of the like-polarity poles. As will be appreciated by those skilled in the art, it will be possible to wrap the coils to provide alternating polarity poles.

The reluctance of the annular end-pieces is much less than the reluctance of the gap between the pole pieces and the rotor, on the order of one tenth in the preferred embodiment, so that the reluctance defined by the gaps between the pole pieces and the rotor for the most part determines the reluctance of the magnetic circuit of the antifriction bearings constructed in accord with the present invention. Because the number of poles is lessened by a factor of two, there being a minimum of four (4) poles for antifriction bearings constructed in accord with the present invention as opposed to a minimum of eight (8) poles for magnetic bearings constructed in accord with the prior art, and since the reluctance exhibited by antifriction bearings constructed in accord with the present invention is lessened by a factor of up to one half that of the heretofore known devices for the same total pole area, and force which corresponds thereto, the number of ampere turns to produce the same force is lessened by the same factor.

The electrical power required is related to the square of the ampere turns. Since the reluctance is reduced by a factor of up to one half, the power consumed by antifriction bearings constructed in accord with the instant invention is reduced by a factor of up to one fourth over that of the heretofore known devices. Antifriction bearings constructed in accord with the present invention thereby enable to provide either the same power consumption for more force, or less power consumption for the same force, than the heretofore known magnetic bearings.

Antifriction bearings constructed in accord with the present invention have axial magnetic flux paths, in addition to the circumferential flux paths of the prior magnetic bearings, that enables to provide stators that have radial backiron dimensions less than the thickness of the pole pieces as in the heretofore known magnetic bearings. As one result, for the same pole area and corresponding force, the present invention enables to provide smaller radially-dimensioned bearings for the same force, or enables to provide greater force for the same radial dimension bearing.

Other geometric advantages that belong to the antifriction bearings constructed in accord with the present invention are larger volumes in which to wrap the coils, and retention of the coils by the annular end-pieces.

The rotor and the pole pieces should be, but need not be, fabricated in a laminated manner to keep core losses to a minimum. For both, the laminations, for example, may be silicon iron.

Figure 5:
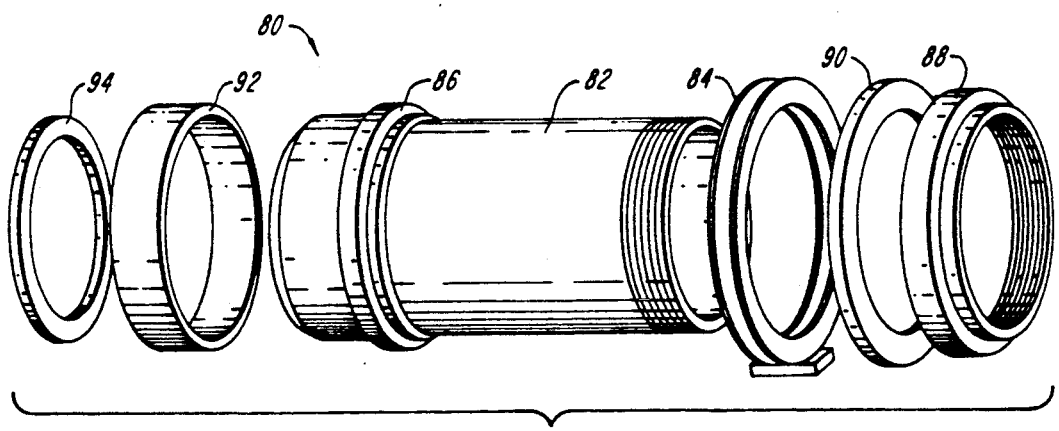
FIG. 5 is an exploded perspective view of a laminated rotor constructed in accord with the high-speed, low-loss anti-friction bearing assembly of the present invention.

Referring now to FIG. 5, generally designated at 80 is an exploded perspective view of one laminated rotor assembly in accord with the antifriction bearing assembly of the present invention. The rotor assembly 80 includes a cylindrical member 82 of a high permeability material, such as carbon steel, along which a plurality of annular laminates 84, of a high permeability magnetic material, such as silica iron, are slidably received and retained between end-pieces 86, 88 threadably received on the ends of the member 82. In one embodiment, the laminates 84 are slid over the member 82, cement is applied therearound and allowed to seep by capillary action through the laminates 84, attaching the same to the member 82 when dry. In an alternative embodiment, the laminates may be shrink-fitted to the member 82, as by cooling the member 82 and heating the laminates 84, and allowing them to expand into tight frictional engagement. The ring 90 provides a part of the rotor, while the rings 92, 94 respectively provide a conductive ring used for sensing rotor position and a clamp for the member 92.

Many modifications of the presently disclosed invention will become apparent to those skilled in the art having benefitted from the disclosure thereof.

What is claimed is:

1. A high-speed low-loss antifriction bearing assembly, comprising:
    an elongated stator having an inside circumferential wall and defining first and second opposing ends;
    an elongated member to be magnetically suspended concentrically disposed for rotation within the stator;
    four elongated pole pieces disposed about the inside circumferential wall of the stator in equal angular increments of ninety degrees such that opposing pairs of the four elongated pole pieces define orthogonal X, Y, axes and in such a way that each pole piece of the opposing pairs of pole pieces defines with respect to the elongated member a preselected, comparatively-high magnetic reluctance;
    first and second annular end-pieces respectively disposed at said first and second opposing ends of said elongated stator in such a way that each annular end-piece defines with respect to the elongated member a preselected, comparatively-low magnetic reluctance; and
    coils wrapped about said pole pieces to provide magnetic fields of predetermined polarity that act to magnetically suspend said elongated member about said orthogonal X, Y axes.

2. The invention of claim 1, wherein said elongated member and said stator consist in part of laminations of a high magnetic permeability material.

3. The invention of claim 2, wherein said laminations are shrunkfit on said elongated member.

4. The invention of claim 2, wherein said laminations are adhesively attached to said elongated member.

5. The invention of claim 2, wherein said fields of predetermined polarity are all of identical polarity.

6. The invention of claim 5, wherein said coils are control coils individually wrapped about each of said four pole pieces, and said magnetic fields provided thereby both circumferentially travel about the circumferential wall of the elongated stator from each pole to all the other poles as well as axially travel along said elongated stator axially outwardly towards both opposing ends thereof, and returns through associated ones of the first and second annular end-pieces back through the elongated member and to the corresponding pole.

7. The invention of claim 5, wherein the coils are control coils wrapped in series about the pole pieces of opposing pairs of pole pieces and said magnetic fields produced thereby travel circumferentially from each pole piece about the circumferential wall of the elongated stator back through all the other pole pieces as well as axially from each pole piece towards each of the annular end-pieces and return through corresponding ones of the annular end-pieces back through the elongated member and to each pole, as well as bias coils wrapped in series about all of the four pole pieces the magnetic fields of which travel axially along the elongated stator and return through corresponding end-pieces through the elongated member back to the corresponding pole piece.

8. The invention of claim 2, wherein said preselected comparatively-high magnetic reluctance of said pole pieces and said preselected comparatively-low magnetic reluctance of said first and second annular end-pieces are selected in a ratio of about one (1) to ten (10).

9. A high-speed low-loss antifriction bearing assembly, comprising:
    a rotor;
    an elongated stator having four identical-polarity magnetic poles radially depending from a central, circumferential portion of the stator and two annular end-pieces one to each side of the stator, the poles having a preselected area and preselected pole-to-rotor gap that are selected to provide a comparatively-high reluctance and the end-pieces have a preselected area and end-piece-to-rotor gap selected to provide a comparatively-low reluctance between individual annular end-pieces and the rotor, each magnetic pole producing flux that flows along a flux path that includes a circumferential component that extends around the central circumferential portion of the stator and through the other three poles and across the associated comparatively-high reluctance between the poles and the rotor and an axial component that extends from each pole in both directions along the elongated stator and through respective annular end-pieces and across the associated comparatively-low reluctance gap.

10. The invention of claim 9, wherein said rotor is constituted at least in part by a laminated construction.

11. The invention of claim 9, wherein said stator poles are constituted at least in part by a laminated construction.

12. The invention of claim 9, wherein said like-polarity magnetic poles include coils.

13. The invention of claim 12, wherein said coils include control coils.

14. The invention of claim 13, wherein said coils further include bias coils.

15. The invention of claim 9, wherein said annular end-pieces have free ends that are of a surface area greater than the surface area defined by an annular section through interior portions of the annular end-pieces.

* * * * *